(12) United States Patent
Carmean et al.

(10) Patent No.: US 6,366,984 B1
(45) Date of Patent: Apr. 2, 2002

(54) WRITE COMBINING BUFFER THAT SUPPORTS SNOOP REQUEST

(75) Inventors: Douglas M. Carmean, Beaverton; Brent E. Lince, Hillsboro, both of OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/309,726

(22) Filed: May 11, 1999

(51) Int. Cl.[7] .............................................. G06F 12/08
(52) U.S. Cl. ..................... 711/141; 710/52; 710/53; 710/54; 710/55; 710/56; 710/57; 711/117; 711/118; 711/119; 711/142; 711/143; 711/145
(58) Field of Search .............. 710/52–57; 711/117–132, 711/141–145, 154–159

(56) References Cited

U.S. PATENT DOCUMENTS

| | | | | |
|---|---|---|---|---|
| 5,561,780 A | * | 10/1996 | Glew et al. .................. | 711/126 |
| 5,671,444 A | * | 9/1997 | Akkary et al. ................. | 710/52 |
| 5,751,996 A | * | 5/1998 | Glew et al. .................. | 711/145 |
| 6,122,715 A | * | 9/2000 | Palanca et al. .............. | 711/154 |

\* cited by examiner

*Primary Examiner*—Than Nguyen
(74) *Attorney, Agent, or Firm*—Blakely, Sokoloff, Taylor & Zafman LLP

(57) ABSTRACT

A write combining buffer that supports snoop requests includes a first cache memory and a second cache memory. The apparatus also includes a write combining buffer, coupled to the first and second cache memories, to combine data from a plurality of store operations. Each of the plurality of store operations is to at least a part of a cache line, and the write combining buffer can be snooped in response to requests initiated external to the apparatus.

20 Claims, 4 Drawing Sheets

WRITE COMBINING BUFFER THAT SUPPORTS SNOOP REQUEST

BACKGROUND OF THE INVENTION

1. Field of the Invention

The present invention pertains to cache memories. More particularly, this invention relates to a write combining buffer that supports snoop requests.

2. Background

As the use of and need for computer systems has increased, so too has the desire for ever-increasing performance. Faster and faster processors and computer systems are continually being developed to meet the needs of users throughout the world. One feature commonly found in processors to increase their performance is one or more cache memories. A cache memory is a memory unit that is smaller than the system memory (or the next higher level cache memory), but that operates at a faster speed than the system memory (or the next higher level cache memory). The goal of the cache memory is to contain the information (whether it be data or operations) that the execution unit(s) of the processor is going to use next. This information can then be returned to the execution unit(s) much more quickly, due to the higher speed of the cache memory.

Two types of cache memories are commonly used, one being referred to as a "writeback" cache, while the other is referred to as a "writethrough" cache. The writeback cache can contain a different version of data (e.g., a modified version) than is contained in the higher level cache memory or system memory. When necessary, modified data from the cache is written back to the higher level cache memory or system memory. The writethrough cache does not contain different versions of data than the higher level cache memory or system memory. Rather, when modified data is written to the cache, it is also written "through" the cache to the higher level cache memory or system memory, thereby avoiding any need to writeback data.

However, one problem that exists with writethroug cache memories is the traffic that occurs on the bus between the memories. Because each of the writes is passed through the first cache memory to the second cache memory, a large amount of data is transferred between the two memories. One solution to this data traffic problem is to use a write combining buffer to temporarily store write data from the first cache memory to the second cache memory. However, in a multiprocessor environment that needs to support accesses from multiple processors, this is not straightforward to do. Multithreaded processors further complicate implementation of write combining buffers. One option is to support only weak-ordered memory (e.g., non-speculative, non-snooped memory types), thereby eliminating the need to be concerned with cache coherency. However, given the amount of speculative and snooped memory types that are used in current processors, such a constraint greatly limits the situations in which the write combining buffer can be used. There is currently no way to provide support for such a write combining buffer for other than weak-ordered memory. The present invention provides such support.

SUMMARY OF THE INVENTION

A write combining buffer that supports snoop requests is described herein. According to one aspect of the present invention, an apparatus includes a first cache memory and a second cache memory. The apparatus also includes a write combining buffer, coupled to the first and second cache memories, to combine data from a plurality of store operations. Each of the plurality of store operations is to at least a part of a cache line, and the write combining buffer can be snooped in response to requests initiated external to the apparatus. In multithreaded embodiments, snoops can be in response to other threads.

According to one aspect of the present invention, a method includes receiving a plurality of store operations to a cache line and temporarily storing data corresponding to the plurality of store operations in a write combining buffer of an apparatus. The method also includes snooping the write combining buffer in response to requests initiated external to the apparatus. In multithreaded embodiments, snoops can be in response to other threads.

BRIEF DESCRIPTION OF THE DRAWINGS

The present invention is illustrated by way of example and not limitation in the figures of the accompanying drawings, in which like references indicate similar elements and in which.

DETAILED DESCRIPTION

In the following description, various aspects of the present invention will be described. However, it will be understood by those skilled in the art that the present invention may be practiced with only some or all aspects of the present invention. For purposes of explanation, specific numbers, materials and configurations are set forth in order to provide a thorough understanding of the present invention. However, it will also be apparent to those skilled in the art that the present invention may be practiced without these specific details.

In the discussions to follow, various operations will be described as multiple discrete steps in turn in a manner that is helpful in understanding the present invention. However, the order of description should not be construed as to imply that these operations are necessarily order dependent (in particular, on the order of their presentations).

Figure 1:
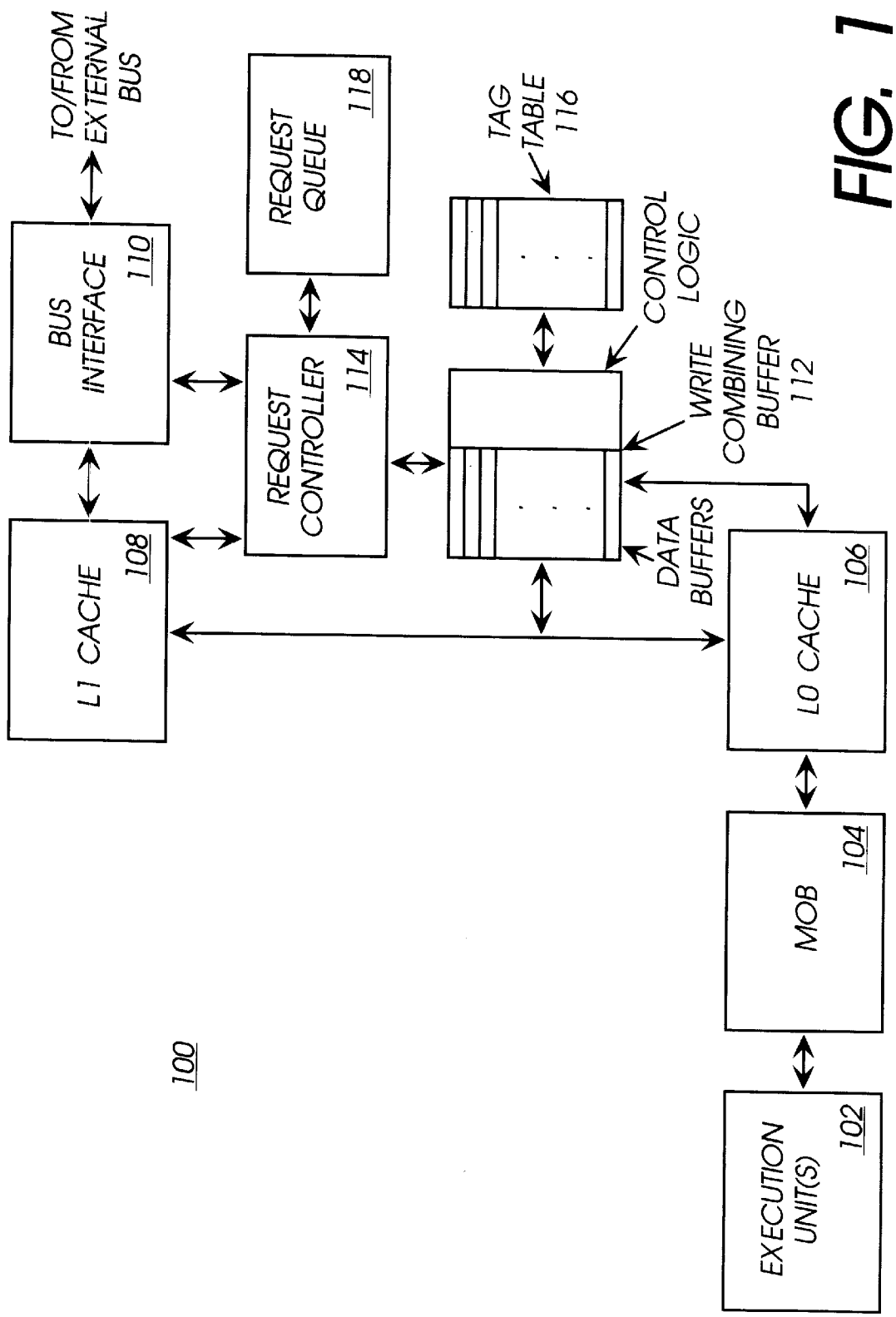
FIG. 1 is a block diagram illustrating a processor incorporating one embodiment of the present invention.

FIG. 1 is a block diagram illustrating a processor incorporating one embodiment of the present invention. As illustrated, the processor 100 includes one or more execution units 102, a memory ordering buffer (MOB) 104, a level zero (L0) cache 106, a level one (L1) cache 108, a bus interface 110, a write combining buffer 112, a request controller 114, a tag table 116, and a request queue 118, coupled together as shown.

Execution unit(s) 102 represent any one or more of a variety of conventional execution units that may be found within a processor. Examples of such execution units include integer execution units, floating point execution units, address generation units, etc. In the illustrated embodiment, the processor 100 supports out of order execution (for example, as is done in the Pentium® Pro processor available from Intel Corporation of Santa Clara, Calif.). In the processor 100, the MOB 104 operates to ensure that store operations from the execution units, which may be executed by the execution unit(s) 102 out of order, are provided to the memory subsystem in program order. It is to be appreciated that, in alternate embodiments (e.g., embodiments which do not support out of order execution), the MOB 104 need not be included. Such memory ordering buffers are well-known to those skilled in the art and thus will not be discussed further except as they pertain to the present invention.

The bus interface 110 couples the processor 100 to an external bus, thereby allowing the processor 100 to communicate with other devices in a computer system, such as system memory. It is to be appreciated that the particular design and functions of the bus interface 110 are dependent on the bus protocols used in the computer system into which the processor 100 is placed, and are not particularly germane to the present invention.

Load and store operations (also referred to as read and write operations or instructions) from the execution unit(s) 102 are provided to the memory subsystem by the MOB 104. The MOB 104 provides such operations to the L0 cache 106. In the illustrated embodiment, the L0 cache 106 is a writethrough cache, whereas the L1 cache 108 is a writeback cache. Data returned in response to load operations is returned to the MOB 104 from the L0 cache 106. If the requested data for the load operation is stored in the L0 cache 106, then the load operation is satisfied by the L0 cache 106. If the requested data is not stored in the L0 cache 106, then the data is retrieved from the L1 cache 108, if the data resides there, and otherwise is satisfied by accessing another layer of memory in the memory hierarchy external to the processor 100 via the bus interface 110. The data to satisfy any such load operation is returned from the higher level cache memory (e.g., the L1 cache 108) or external memory to the L0 cache 106, from which it is then provided to the MOB 104.

In one embodiment, the execution unit(s) 102 and the MOB 104 operate in a first time domain while the L0 cache 106, the L1 cache 108, and the write combining buffer 112 operate in a second time domain. In one implementation, the clock frequency of the first time domain is twice that of the second time domain. In this implementation, the L0 cache 106 includes two input/output port couplings to the MOB 104. This allows the MOB 104 to provide consecutive accesses to the L0 cache 106, rather than limiting the MOB 104 to only one access every other clock cycle. In an alternative embodiment, the executions unit(s) 102 operate in a first time domain while the MOB 104, the L0 cache 106, the L1 cache 108, and the write combining buffer 112 operate in a second time domain.

The write combining buffer 112 operates to collapse multiple store operations into a single cache line write to the L1 cache 108. By collapsing multiple stores into a single cache line write, the traffic on the bus between the L0 cache 106 and the L1 cache 108 is reduced. For example, if store operations to sequential bytes of the same cache line are executed by an execution unit 102, then the multiple bytes can be stored temporarily in the write combining buffer 112. A single write of the cache line from the write combining buffer 112 to the L1 cache 108 then occurs, rather than a different transfer to the L1 cache 108 for each of the bytes written for the cache line. Thus, it is to be appreciated that the write combining buffer 112 is used primarily for store operations. However, as discussed in more detail below, the write combining buffer 112 may also affect load operations under certain circumstances.

Store operations are received by the L0 cache 106 from the MOB 104 and cause the L0 cache 106 to perform a cache lookup. This lookup results in either the address corresponding to the store operation matching an address of data already located in the L0 cache 106 (a cache "hit"), or the store operation not matching any addresses of data already located in the L0 cache 106 (a cache "miss").

In one embodiment, the store operation hits the L0 cache 106 then the requested data is returned to the MOB 104 from the L0 cache 106. When the store operation hits the L0 cache 106, the write combining buffer 112 is not involved in handling the store operation. Store operations that miss the L0 cache 106 are transferred to the write combining buffer 112. Handling of store operations by the write combining buffer 112 according to one embodiment of the present invention is described with reference to FIG. 1 in conjunction with FIG. 2, which illustrates the actions carried out by the write combining buffer.

In an alternative embodiment, store operations that miss the L0 cache 106 and store operations that hit the L0 cache 106 are transferred to the write combining buffer 112. If the store operation causes a miss in the L0 cache 106, a background fill is performed to access the data that caused the miss. Handling of the store operation by the write combining buffer 112 is then performed as described below with reference to FIG. 2.

In the illustrated embodiment, the write combining buffer 112 includes control logic and multiple data buffers, each capable of storing a cache line of the size used by the L0 cache 106. Typical values for the number of data buffers in the write combining buffer 112 range from 4 to 32. In one embodiment the write combining buffer 112 includes 6 buffers; however, any number of buffers can be included in the write combining buffer 112.

The write combining buffer 112 initially receives the store operation, step 202. The write combining buffer 112 then checks whether there is already a data buffer that matches the address of the store operation, step 204. That is, the write combining buffer 112 checks whether a part of the cache line that the store operation corresponds to is already in a data buffer of the write combining buffer 112 (e.g., as a result of a previously received store operation). As illustrated in FIG. 1, each of the data buffers in the write combining buffer 112 includes a corresponding entry in a tag table 116. The tags in table 116 identify the addresses of the data stored in the corresponding data buffers of the write combining buffer 112. Thus, the write combining buffer 112 can check whether there is already a data buffer that matches the address of the store operation by comparing the address of the store operation to the tags in tag table 116.

If there is not a data buffer that matches the address of the store operation, then the write combining buffer 112 checks whether there is an available data buffer, step 206. If there is an available data buffer, then the data is stored in an available buffer and the address information for the cache line that the data is part of is stored in the corresponding entry of the tag table 116, step 208. This process in step 208 of storing data into an available data buffer is also referred to as "opening" a data buffer.

However, if there is not an available data buffer, then an available data buffer is created by evicting a cache line from a data buffer of the write combining buffer 112, step 210. The selection of which cache line to evict can be done in any of a wide variety of conventional manners, such as by following a least recently used methodology in which the least recently used cache line is selected for eviction, or by following a first-in/first-out (FIFO) methodology in which the cache line from the earliest filled data buffer is elected for eviction, etc. A least recently used (LRU), or modification of LRU can also be used. Also, a prediction scheme based on operations in the MOB 104 can be used for eviction purposes. It should be noted, however, that the cache line that is evicted is one that is "owned" by the write combining buffer 112. The ownership of the data by the write combining buffer 112 is discussed in more detail below. The cache line is evicted by writing the cache line from the buffer to both the L0 cache 106 and the L1 cache 108. Once a data buffer is made available, processing continues at step 208, and the data for the store operation is stored in the newly available data buffer.

Figure 3:
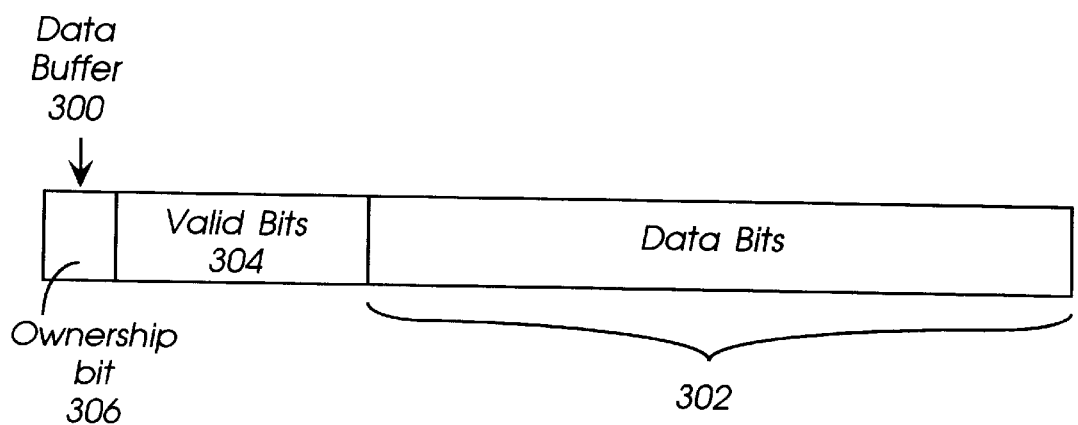
FIG. 3 illustrates a data buffer of the write combining buffer according to one embodiment of the present invention.

When the data for the store operation is stored in a data buffer, the data is marked as valid, but not owned, step 212. FIG. 3 illustrates a data buffer of the write combining buffer 112 according to one embodiment of the present invention. As illustrated, the data buffer 300 includes data 302, valid bits 304, and an ownership bit 306. The data 302 is equal in size to a cache line of the size used by the L0 cache 106 of FIG. 1, which is 64 bytes according to one implementation. The write combining buffer 112 can store data to the buffer 300 at a granularity of one byte. The valid bits 304 include one valid bit corresponding to each and 8-byte chunk in the data 302 (thus, there are eight valid bits according to the implementation having 64 bytes of data 302). The valid bits 304 indicate whether the corresponding bytes in the data 302 contain valid data. The ownership bit 306 is a single bit indicating whether the cache line corresponding to the data in the buffer 300 is owned by the write combining buffer 112. The ownership bit 306 is used to help ensure memory ordering is maintained, and is used for subsequent snoop operations in response to requests from other devices external to the processor 100 as well as to determine whether subsequent stores can be written into the write combining buffer 112, as discussed in more detail below.

Returning to FIG. 2, the valid bit(s) for the data that is written to the data buffer for the store operation are set in step 212 to indicate that the corresponding bytes in the data buffer are valid. Additionally, the ownership bit is cleared in step 212 to indicate that the write combining buffer does not yet have ownership of the cache line corresponding to the data. The write combining buffer 112 then performs a read for ownership (RFO) of the cache line corresponding to the data, step 214. A read for ownership request is placed into the request queue 118 and request controller 114 proceeds to obtain ownership of the corresponding cache line. The read for ownership operation obtains ownership of a particular cache line, thereby allowing the obtaining device to modify the cache line without fear of creating a data inconsistency. Read for ownership operations are well-known to those skilled in the art, and thus will not be discussed further except as they pertain to the present invention.

To obtain ownership of the cache line, the request controller 114 first accesses the L1 cache 108 to determine whether the L1 cache 108 has ownership of the cache line. According to one embodiment of the present invention, the well-known MESI cache coherency protocol is employed by the processor 100. Thus, pursuant to MESI, if the L1 cache 108 stores the requested cache line in either the modified (M) or exclusive (E) states, then the L1 cache 108 owns the cache line. In this situation, the L1 cache 108 can satisfy the RFO requests, so the request controller 114 transfers the cache line from the L1 cache 108 to the data buffer of the write combining buffer 112, filling in any invalid bytes of the data buffer. In other words, when transferring the cache line from the L1 cache 108, bytes in the write combining buffer 112 data buffer that are marked as valid are not overwritten with data from the L1 cache 108. By combining the data from the store operation from the MOB 104 with the fill data from the L1 cache 108, a modified cache line is created in the write combining buffer 112. This cache line will be subsequently returned to the L0 cache 106 and the L1 cache 108, and marked in the modified (M) state in the L1 cache 108.

However, if the cache line is marked in the L1 cache 108 in either the shared (S) or invalid (I) state, then the request controller 114 transmits a read for ownership request out onto the bus via the bus interface 110. Eventually, the read for ownership request will be satisfied by a device external to the processor 100 and the requested cache line will be provided to the request controller 114 from the bus interface 110. The cache line is transferred to the L1 cache 108 and to the write combining buffer 112. The received cache line is then transferred into the appropriate data buffer of the write combining buffer 112, filling in any invalid bytes of the data buffer.

Figure 2:
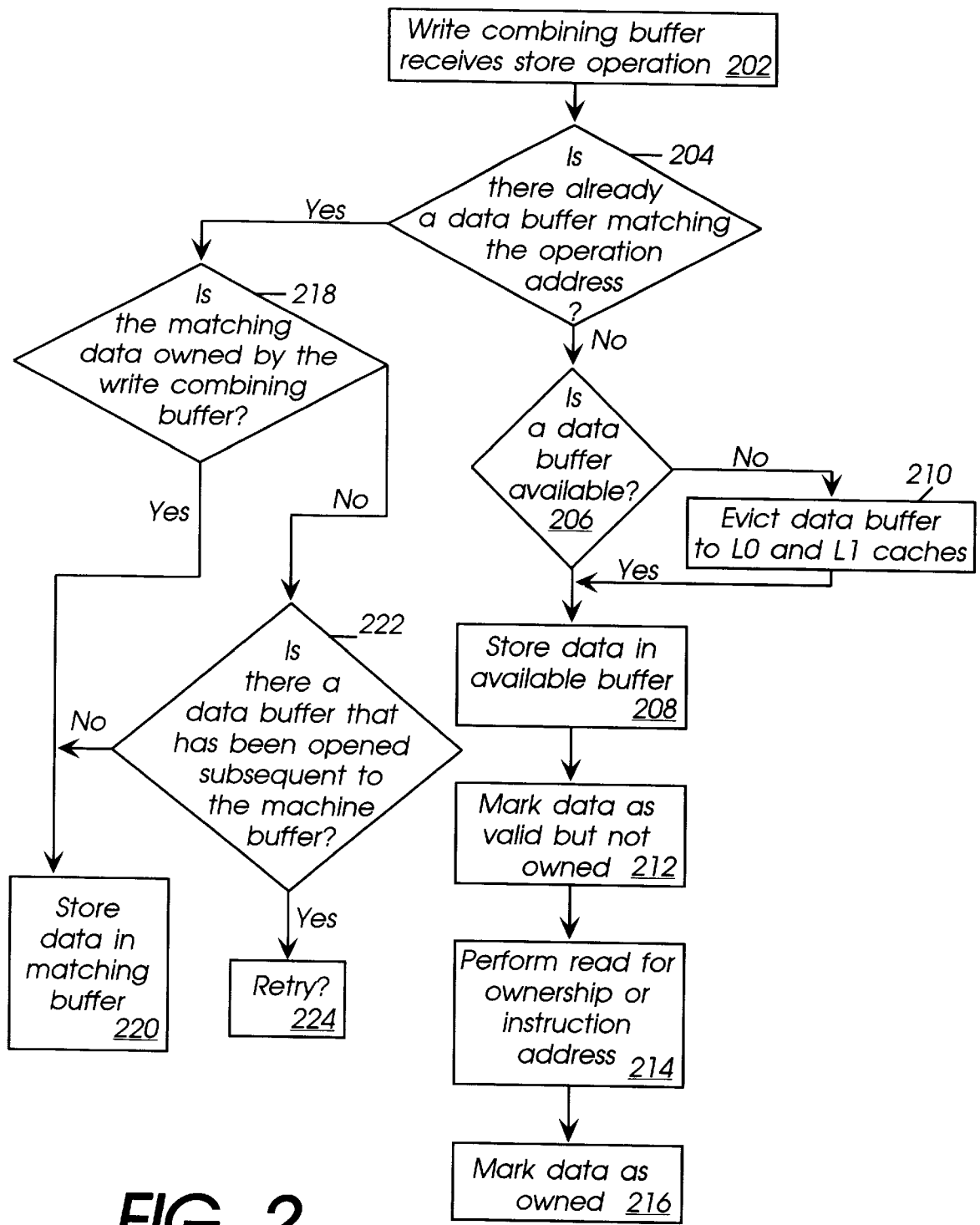
FIG. 2 is a flowchart illustrating the actions carried out by the write combining buffer according to one embodiment of the present invention.

Once the read for ownership has been completed in step 214 of FIG. 2, the data in the data buffer is marked as owned, step 216. In the illustrated embodiment, this is accomplished by setting the ownership bit of the data buffer. It is to be appreciated that, in owning the data in the data buffer (which is a cache line), the write combining buffer 112 owns that cache line.

Returning to step 204, if there is already a data buffer with a tag that matches the address of the store operation, then the write combining buffer 112 checks whether it owns the data in that data buffer, step 218. This checking can be accomplished by checking whether the ownership bit for the data buffer is set. If the data is owned by the write combining buffer 112, then the data is stored in the data buffer, step 220.

However, if the data is not owned by the write combining buffer 112, then the write combining buffer 112 checks where there is a data buffer that has been opened subsequent to the opening of the buffer that the data is to be written to (that is, the buffer that matches the store operation), step 222. If there is no such subsequently opened buffer, then the data is stored in the data buffer, step 220. However, if there is a subsequently opened buffer, then the data cannot yet be stored in the data buffer. Rather, the data is returned to the MOB 104 and the MOB 104 retries the operation of step 220.

According to one embodiment of the present invention, multiple read for ownership (RFO) requests can be queued in queue 118, however only one RFO request can be outstanding beyond the queue 118 (that is, to the L1 cache 108 or an external device via the bus interface 110). Furthermore, the controller 114 uses the queue 118 in a FIFO manner, resulting in the RFO requests being satisfied in order.

Thus, when only one RFO request can be outstanding beyond the queue 118, it can be seen that the write combining buffer 112 operates according to the following rules. Data can be combined in a previously opened data buffer if the write combining buffer owns the cache line for that data. If the write combining buffer does not own the cache line for that data, then data can be combined in that previously opened data buffer only if there is no subsequently opened data buffer.

Data owned by the write combining buffer 112 can also be written to the L0 cache 106 and to the L1 cache 108 in response to a memory serialization event. Memory serialization events include a flush of the processor state, a snoop, and L0 cache conflicts. Other events can also cause data owned by the write combining buffer 112 to be written to the L0 cache 106 and to the L1 cache 108.

According to an alternate embodiment, multiple RFO requests can be outstanding beyond the queue 118. Allowing for multiple outstanding RFO requests provides the ability to let RFO requests issued from the controller 114 to be completed before previously issued RFO requests are completed. For example, a first RFO request may miss the L1 cache 108 and thus need to be satisfied by memory external to the processor 100. However, a second RFO request, issued subsequent to the first RFO request, may hit the L1 cache 108 and, if the cache line is in the cache 108 in a modified (M) or exclusive (E) state, then the second RFO request will most likely be satisfied before the external memory access is completed and the first RFO request is satisfied.

In embodiments where multiple RFO requests can be pending beyond the queue 118, the write combining buffer 112 operates according to the following rule: data can be combined in a previously opened data buffer going as far back in the queue (in the reverse order of the opening of the buffers) as desired up to the point where there is a queue entry without ownership.

Requests can be received by the processor 100 from other external devices which cause the processor 100 to snoop its cache memories in order to determine whether the processor 100 has a copy of a particular cache line (and if so, what MESI state the cache line is in). Situations can arise where such a request received by the processor 100 corresponds to a cache line for which there is valid data in a data buffer of the write combining buffer 112.

The response of the write combining buffer 112 in such situations is dependent on whether the write combining buffer 112 owns the cache line. If the write combining buffer 112 does not yet own the cache line, then in response to a snoop request the write combining buffer 112 simply acts as if it does not have any valid data for that cache line. This results in the other device finishing its processing with the data, after which the read for ownership request issued by the controller 114 for that cache line will be satisfied by obtaining that cache line from whatever device has the cache line at the time. However, if the write combining buffer does own the cache line, then in response to a snoop the write combining buffer 112 writes back the cache line to the L1 cache 108. The cache line is then available and valid in the L1 cache 108, which can respond in a normal manner to the snoop request.

Furthermore, it should be noted that in the illustrated embodiment the only writes that occur to the L1 cache 108 from the write combining buffer 112 are of a full L0 cache line size. Thus, byte writes to the L1 cache 108 do not need to be supported by the L1 cache 108. This reduces complexity and increases performance of the L1 cache 108 by reducing the work necessary to implement an error correction protocol (ECC) in the L1 cache 108. In order to support byte writes and ECC, the L1 cache 108 would have to perform a read-modify-write operation for each byte write in order to compute the ECC over the entire cache line. However, in the illustrated embodiment, the ECC can be computed as the cache line is being written into the L1 cache 108, thereby avoiding the necessity of a read-modify-write operation for each write to the L1 cache 108.

Figure 4:
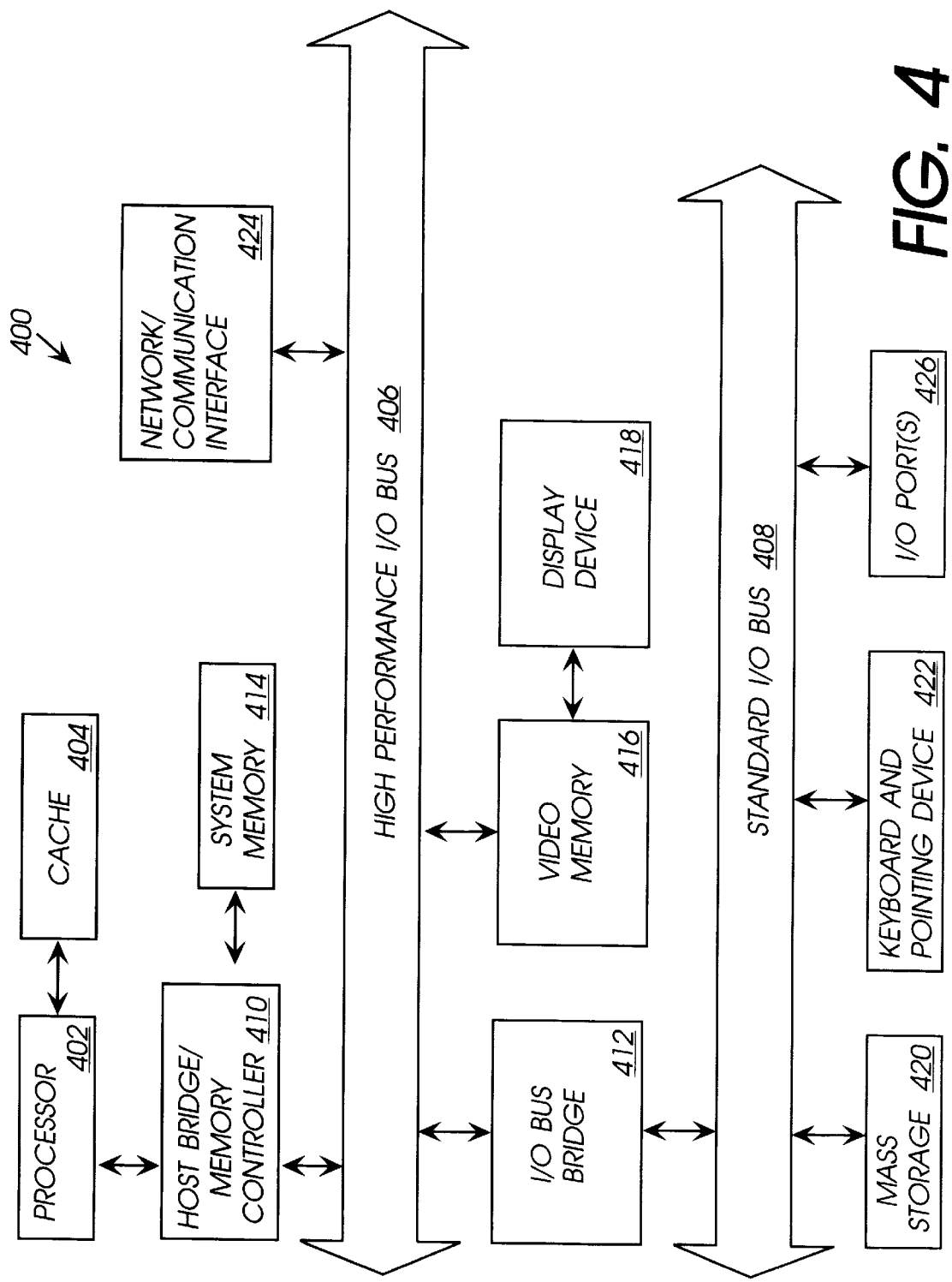
FIG. 4 illustrates a computer system in which one embodiment of the present invention may be practiced.

FIG. 4 illustrates a computer system in which one embodiment of the present invention may be practiced. In the illustrated embodiment, processor 100 of FIG. 1 is processor 402 of FIG. 4. In the illustrated embodiment, computer system 400 includes processor 402 and cache memory 404 (e.g., a level two (L2) cache) coupled to each other as shown. Additionally, computer system 400 includes high performance input/output (I/O) bus 406 and standard I/O bus 408. Host bridge/memory controller 410 couples processor 402 to high performance I/O bus 406, whereas I/O bus bridge 412 couples the two buses 406 and 408 to each other. Coupled to bus 406 are network/communication interface 424 and video memory 416. In turn, display device 418 is coupled to video memory 416. Coupled to bus 408 is mass storage 420, keyboard and pointing device 422, and I/O ports 426. Collectively, these elements are intended to represent a broad category of computer systems, including but not limited to general purpose computer systems based on the Pentium® Pro processor manufactured by Intel Corporation of Santa Clara, Calif.

These elements 404–426 perform their conventional functions known in the art. In particular, network/communication interface 424 is used to provide communication between system 400 and any of a wide range of conventional networks, such as an Ethernet, token ring, the Internet, etc. It is to be appreciated that the circuitry of interface 424 is dependent on the type of network the system 400 is being coupled to.

I/O ports 426 are one or more serial and/or parallel communication ports used to provide communication between additional peripheral devices which may be coupled to computer system 400.

It is to be appreciated that various components of computer system 400 may be re-arranged. For example, cache 404 may be on-chip with processor 402, or may be situated between processor 402 and bridge/controller 410. Alternatively, cache 404 and processor 402 may be packaged together as a "processor module" and attached to a "processor card", with processor 402 being referred to as the "processor core". Furthermore, certain implementations of the present invention may not require nor include all of the above components. For example, mass storage 420, keyboard and pointing device 422, and/or display device 418 and video memory 416 may not be included in system 400. Additionally, the peripheral devices shown coupled to standard I/O bus 408 may be coupled to high performance I/O bus 406; in addition, in some implementations only a single bus may exist with the components of computer system 400 being coupled to the single bus. Furthermore, additional components may be included in system 400, such as additional processors (either the same as or different from processor 402, including digital signal processors), storage devices (either fixed or removable) and device controllers, or memories.

Thus, the write combining buffer of the present invention advantageously collapses store operations between two cache memories, thereby reducing the amount of data traffic between the cache memories. Furthermore, the write combining buffer of the present invention advantageously maintains memory ordering among a multi-level memory hierarchy and in a multi-processor system, supporting snooping operations to help ensure such ordering.

References in the discussion above to "one embodiment" or "an embodiment" mean that a particular feature, structure, or characteristic described in connection with the embodiment is included in at least one embodiment of the invention. The appearances of the phrase "in one embodiment" in various places in the specification are not necessarily all referring to the same embodiment.

In the discussions above, reference is made to different data sizes, including cache line sizes, data buffer sizes, etc.

It is to be appreciated that these particular sizes are only examples of sizes that can be used with the present invention, and that any of a wide range of data sizes can be used within the spirit and scope of the present invention.

Also in the discussions above, the write combining buffer of the present invention is described as being situated to operate in conjunction with an L0 cache and an L1 cache in a processor. It is to be appreciated that the write combining buffer can also be used in different devices as well as between different memories (e.g., not necessarily between L0 and L1 caches) within the spirit and scope of the present invention.

Thus, a write combining buffer that supports snoop requests has been described. Whereas many alterations and modifications of the present invention will be comprehended by a person skilled in the art after having read the foregoing description, it is to be understood that the particular embodiments shown and described by way of illustration are in no way intended to be considered limiting. References to details of particular embodiments are not intended to limit the scope of the claims.

What is claimed is:

1. An apparatus comprising:
    a first cache memory;
    a second cache memory; and
    a write combining buffer, coupled to the first and second cache memories, to combine data from a plurality of store operations, wherein each of the plurality of store operations is to at least a part of a cache line, and wherein the write combining buffer can be snooped in response to requests initiated external to the apparatus.

2. The apparatus of claim 1, wherein the apparatus comprises a processor.

3. The apparatus of claim 1, wherein the write combining buffer is to receive the data from the plurality of store operations and also to receive, from the second cache memory, fill data for the remainder of the cache line, and combine the data from the plurality of store operations and the fill data to create a modified cache line.

4. The apparatus of claim 3, wherein the write combining buffer is further to transfer the modified cache line to both the first cache memory and the second cache memory.

5. The apparatus of claim 1, wherein the write combining buffer includes a plurality of validity indicators, and wherein selected ones of the plurality of validity indicators are set when the data from the plurality of store operations is transferred to the write combining buffer.

6. The apparatus of claim 1, wherein the write combining buffer is further to issue a read for ownership request for the cache line.

7. The apparatus of claim 1, wherein the write combining buffer further includes an ownership indicator to identify whether the cache line is owned by the write combining buffer.

8. The apparatus of claim 7, wherein the ownership indicator is set upon satisfaction of a read for ownership request.

9. The apparatus of claim 1, further comprising a request queue, coupled to the write combining buffer, to queue a plurality of read for ownership requests.

10. An apparatus comprising:
    a first means for storing;
    a second means for storing; and
    a means, coupled to the first and second means for storing, for combining data from a plurality of store operations, wherein each of the plurality of store operations is to at least a part of a cache line, and wherein the means for combining data can be snooped in response to requests initiated external to the apparatus.

11. The apparatus of claim 10, wherein the apparatus comprises a processor.

12. The apparatus of claim 10, wherein the means for combining is for receiving the data from the plurality of store operations and also for receiving, from the second means for storing, fill data for the remainder of the cache line, and for creating a modified cache line by combining the data from the plurality of store operations and the fill data.

13. The apparatus of claim 12, wherein the means for combining is further for transferring the modified cache line to both the first means for storing and the second means for storing.

14. The apparatus of claim 10, wherein the means for combining includes means for indicating validity, and wherein selected ones of the means for indicating validity are set when the data from the plurality of store operations is transferred to the means for combining.

15. A method comprising:
    receiving a plurality of store operations to a cache line;
    temporarily storing data corresponding to the plurality of store operations in a write combining buffer of an apparatus; and
    snooping the write combining buffer in response to requests initiated external to the apparatus.

16. The method of claim 15, further comprising:
    obtaining fill data for a cache line corresponding to the data; and
    creating a modified cache line by combining the data corresponding to the store operation and the fill data.

17. The method of claim 16, further comprising:
    writing back the modified cache line to both a first cache memory and a second cache memory.

18. The method of claim 15, further comprising:
    selectively setting a plurality of validity indicators in the write combining buffer based on the data corresponding to the plurality of store operations.

19. The method of claim 15, further comprising:
    issuing a read for ownership request for the cache line.

20. The method of claim 19, further comprising:
    setting an ownership indicator in the write combining buffer upon satisfaction of the read for ownership request, wherein the ownership indicator identifies the write combining buffer as the owner of the cache line.

* * * * *

UNITED STATES PATENT AND TRADEMARK OFFICE
CERTIFICATE OF CORRECTION

PATENT NO.   : 6,366,984 B1
DATED        : April 2, 2002
INVENTOR(S)  : Carmean et al.

It is certified that error appears in the above-identified patent and that said Letters Patent is hereby corrected as shown below:

<u>Column 1,</u>
Line 39, delete "writethroug", insert -- writethrough --.

Signed and Sealed this

Twenty-seventh Day of August, 2002

*Attest:*

*Attesting Officer*

JAMES E. ROGAN
*Director of the United States Patent and Trademark Office*